United States Patent [19]

Fountain

[11] 4,352,409

[45] Oct. 5, 1982

[54] CLIMBING SAFETY DEVICE

[76] Inventor: Cecil D. Fountain, 8403 Jackson Springs Rd., Tampa, Fla. 33615

[21] Appl. No.: 226,802

[22] Filed: Jan. 21, 1981

[51] Int. Cl.³ .......................... E06C 5/36; A62B 1/16; E06C 7/18; F16G 11/00

[52] U.S. Cl. .................................... 182/8; 24/134 R; 188/65.2

[58] Field of Search .......................... 182/8, 3, 5, 6, 7; 188/65.2, 65.1; 24/134 KB, 134 R

[56] References Cited

U.S. PATENT DOCUMENTS

| | | | |
|---|---|---|---|
| Re. 30,072 | 8/1979 | Kleine | 182/8 |
| 1,927,469 | 9/1933 | Plumpton | 228/67 |
| 1,955,473 | 4/1934 | Raymer | 227/8 |
| 2,538,904 | 1/1951 | Herod . | |
| 2,616,609 | 11/1952 | Herod | 228/8 |
| 3,317,971 | 5/1967 | Meyer | 24/134 |
| 3,348,632 | 10/1967 | Swager | 182/230 |
| 3,492,702 | 2/1970 | Stafford | 24/126 |
| 3,523,591 | 8/1970 | Fountain | 182/8 |
| 3,979,797 | 9/1976 | Stember | 24/134 |
| 4,034,828 | 7/1977 | Rose | 182/5 |
| 4,059,871 | 11/1977 | Swager | 24/134 R |
| 4,071,926 | 2/1978 | Sweet et al. | 24/136 |
| 4,077,094 | 3/1978 | Swager | 24/134 |
| 4,085,818 | 4/1978 | Swager | 182/47 |
| 4,111,280 | 9/1978 | Devine et al. | 182/8 |
| 4,130,177 | 12/1978 | Pandolph | 182/8 |
| 4,193,475 | 3/1980 | Sweet et al. | 182/8 |
| 4,223,626 | 9/1980 | Heckathorne | 24/134 R |

FOREIGN PATENT DOCUMENTS

| | | | |
|---|---|---|---|
| 2626425 | 6/1976 | Fed. Rep. of Germany | 182/8 |
| 1473300 | 2/1967 | France | 182/8 |
| 47812 | 12/1978 | France | 182/8 |

*Primary Examiner*—Reinaldo P. Machado
*Attorney, Agent, or Firm*—Ward, Lalos, Leeds, Keegan & Lett

[57] ABSTRACT

A device for arresting the fall of a climber ascending or descending along a vertically disposed rail, such as a guide rail secured to a ladder, including a support member having an opening therein for receiving the rail therethrough, a clamping member supported on the support member and engageable with a vertical surface of the rail in clamping relation therewith, at least one connecting link pivotally connected to the support member, and an actuating lever pivotally connected to the connecting link, the actuating lever having one end thereof engageable with the clamping member and an opposite end thereof connectable to the climber where upon a sudden downward movement of the climber, as when the climber may be caused to fall, the connecting end of the actuating lever shall be caused to pivot downwardly, forcing the clamping member and the support member into clamping engagement with the rail, thereby arresting the fall of the climber.

20 Claims, 6 Drawing Figures

CLIMBING SAFETY DEVICE

The present invention relates to a climbing safety device for use with a vertically disposed guide rail, such as a ladder or a tower with rungs thereon which a rail has been secured, for preventing the fall of the user thereof as the user ascends or descends along the rail.

In the prior art, there are various types of climbing safety devices intended for use by individuals in ascending or descending vertically disposed climbing members for preventing the fall of the individual under circumstances where the individual loses his footing or grip on the particular member being climbed, such as ladders and the like. Most of such devices have been found to be suitable to some extent in arresting the fall of the climber. However, such conventional devices also have been found to be unduly complicated in construction, insufficiently effective to instantaneously arrest the fall of the climber when he loses his footing or grip, or cumbersome to the extent of interfering with or impeding the motion of the climber while ascending or descending.

Accordingly, the principal object of the present invention is to provide an improved climbing safety device suitable for use by an individual climbing a vertically disposed member such as a ladder, which is effective in instantaneously arresting the fall and supporting the weight of the individual, when he has accidentally lost his footing or grip on the member being climbed.

A further object of the present invention is to provide an improved climbing safety device suitable for use by an individual for ascending or descending a vertically disposed climbing member which cooperates with a fixed guide means disposed coextensively with and adjacent to the vertically disposed climbing member and which is adapted to be connected to the body of the individual.

A still further object of this invention is to provide a novel climbing safety device suitable for use by an individual for ascending or descending along a vertically disposed climbing member which is adapted to permit normal ascent or descent of the individual but will instantaneously arrest any sudden or abrupt downward movement of the individual.

Another object of the present invention is to provide a novel climbing safety device suitable for use by an individual in ascending or descending along a vertically disposed climbing member which is simple in construction, inexpensive to manufacture, and reliable in performance.

Other objects and advantages of the invention will become more apparent to those persons skilled in the art, from the following description of a practical embodiment thereof, when taken in conjunction with the accompanying drawings which form a part of this specification.

Generally, the present invention includes a support member having an opening for receiving the rail therethrough, a clamping member supported on this support member engageable with the rail in clamping relation therewith, an actuating lever having one end engageable with the clamping member and the opposite end connectable to the climber, and connecting links pivotally connected to the support and clamping members and to the actuating lever. Thus, when the user falls the actuating lever is caused to pivot downwardly forcing the clamping member and the support member into clamping engagement with the rail, and thereby arresting the fall of the user.

Figure 3:
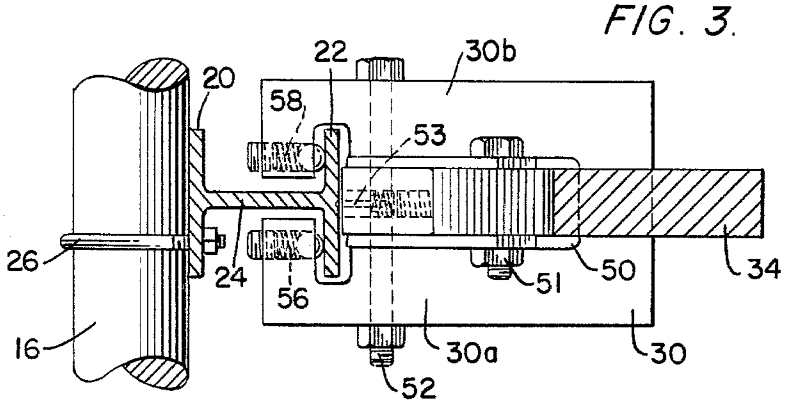
FIG. 3 is a cross-elevational view taken along line 3—3 in FIG. 2.
Figure 1:
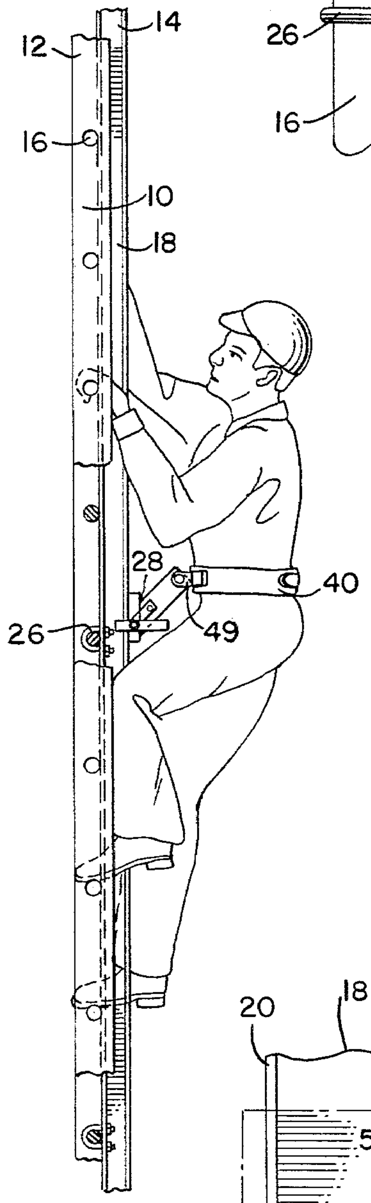
FIG. 1 is an elevational view of an embodiment of the invention, illustrated in its normal operating environment.

Referring to the drawings, there is illustrated a specific embodiment of the invention. The embodiment illustrated in the drawings is adapted to be used with a vertically disposed climbing member such as a ladder 10, as illustrated in FIG. 1. The ladder is of conventional construction, including a pair of spaced side rails 12 and 14 interconnected by a plurality of vertically spaced rungs 16. The guide rail 18, in the perferred embodiment and as shown in the drawings, consists of an I-beam which includes a pair of substantially parallel flanges 20 and 22, and an interconnected web section 24. The guide rail is adapted to be secured rigidly to ladder 10, by a plurality of U-bolts 26. The guide rail is disposed coextensively against the rungs 16 of the ladder intermediate the side rails 12 and 14. Each of the U-bolts 26 is adapted to straddle a rung of ladder, having threaded leg portions thereof extending through openings in the flange 20 of the guide rail. The guide rail is held rigidly against the rungs of the ladder by means of suitable nuts threaded on the legs of the U-bolts.

Figure 6:
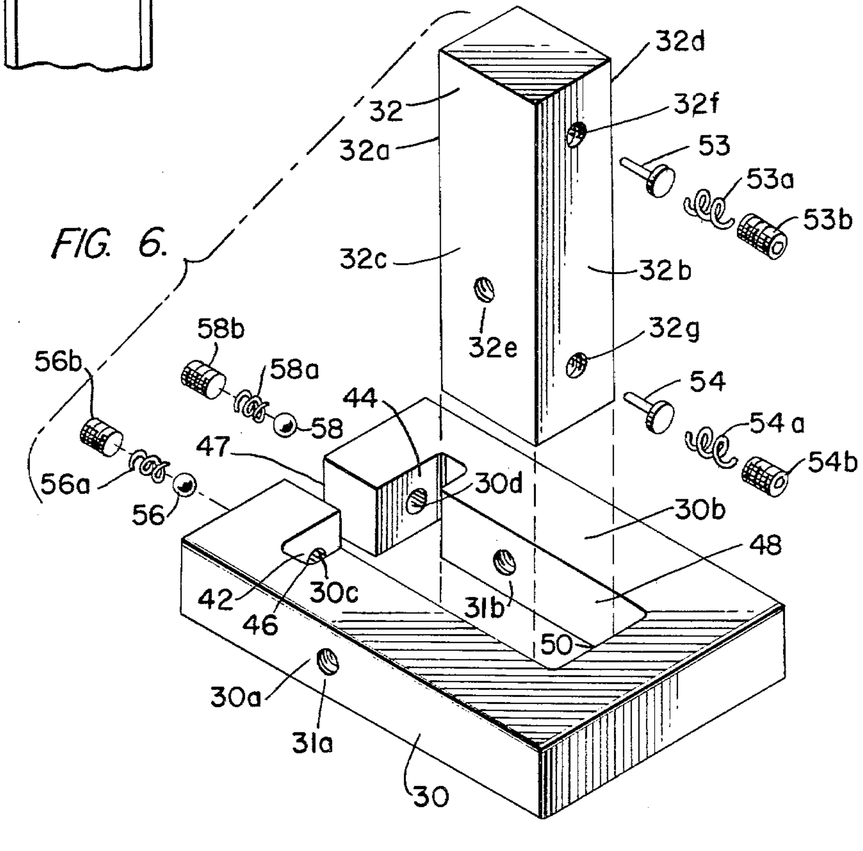
FIG. 6 is a perspective view of a subassembly of the embodiment, illustrating various components thereof in exploded relation.

Locking device 28 generally includes a support member 30, a clamping member 32, an actuating lever 34, a pair of connecting links 36 and 38, and a belt 40 to be worn by the user. Support member 30 is formed with an opening having transverse section 46, slot section 47, and longitudinal section 48, providing flange engaging surfaces 42 and 44. Slot section 47 and longitudinal section 48 are adapted to receive flange 22 and a portion of web section 24 of the guide rail therethrough when the support member 30 is mounted on guide rail 18. The width of transverse section 46 is slightly greater than the thickness of web section 24 to permit the locking device to move along the length of rail 18. As best shown in FIG. 6, side sections **30*a* and 30*b* of support member 30 are provided with transversely aligned openings 31*a* and 31*b* through which bolt 52** may be received.

Figure 4:
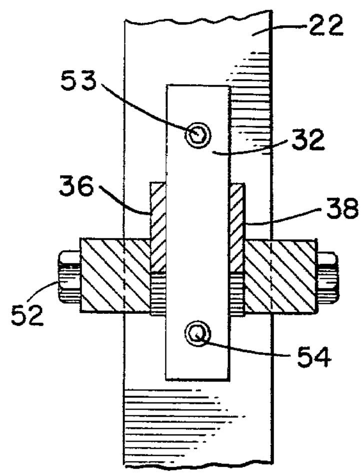
FIG. 4 is a cross-elevational view taken along line 4—4 in FIG. 2.
Figure 2:
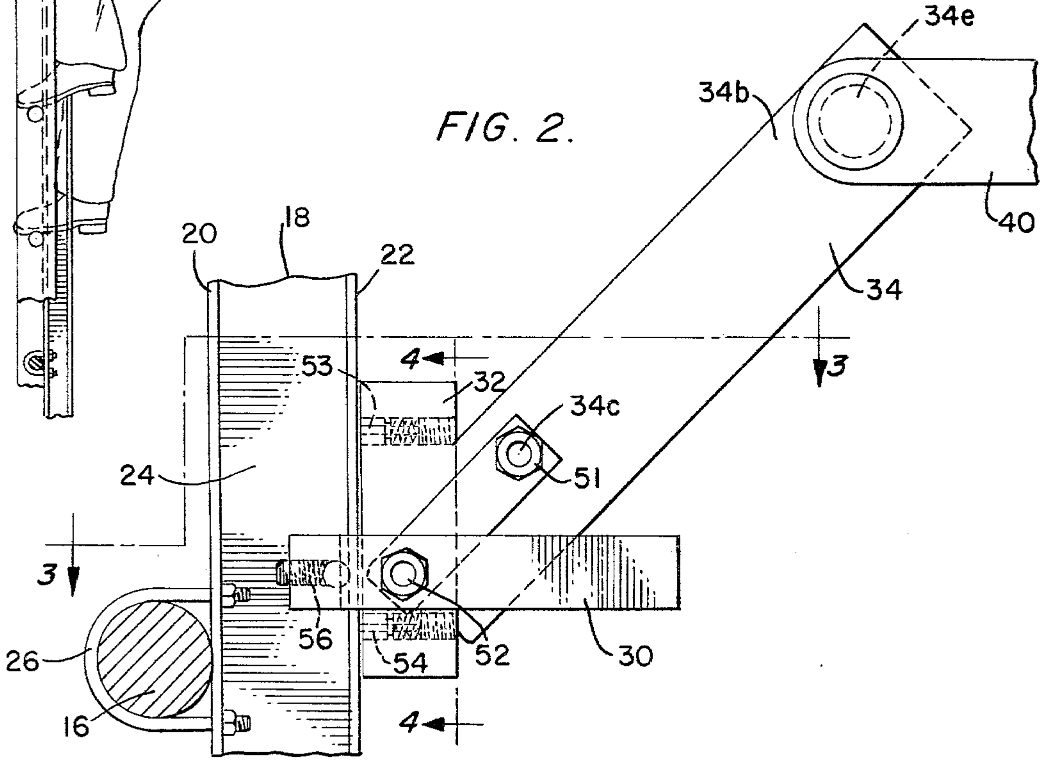
FIG. 2 is a side-elevational view of the rail and the safety device.

Clamping member 32 is substantially rectangular in configuration including front and rear surfaces **32*a* and 32*b* and side surfaces 32*c* and 32*d*. The member is positioned in opening sections 42 and 48 with front surface 32*a* disposed in opposed relation to opening surfaces 44 and 46. It further is provided with transverse opening 32*e* which is registrable with aligned openings 31*a* and 31*b*. Bolt 52 is received through aligned openings 31*a*, 32*c* and 31*b* for supporting the clamping member within the opening in the support member. Connecting links 36 and 38 also are pivotally connected at one set of ends thereof to bolt 52. As best shown in FIG. 4**, the connecting links are received within the opening in the support member and are each interposed between the clamping member and a side portion of the support member.

Actuating lever 34 consists of a rigid bar member and has an end portion 34*a* operatively connected to the locking device and an end portion 34*b* operatively connected to belt 40. End portion 34*a* is provided with a transverse opening for pivotally connecting the lever to a set of ends of connecting links 36 and 38, by means of a bolt 34*c*, and an end surface 34*d* which is adapted to engage rear surface 32b of the clamping member. The opposite end thereof is formed with an opening provided with a pin 34*e* for pivotally connecting the lever to a bracket 49 rigidly secured to the belt of the user.

Clamping member 32 is provided with vertically spaced openings 32*f* and 32*g* in which guide pins 53 and 54 are disposed. Guide pin 53 is urged into engagement with flange 22 by means of spring 53*a* engaging on a seating screw 53*b* threaded into opening 34*f*. Similarly, guide pin 54 is urged into engagement with flange 22 by means of a spring 54*a* engaging a seating screw 54*b* threaded into opening 32*g*. Seating screws 53*b* and 54*b* can be adjusted so as to vary the tension in springs 53*a* and 54*a*.

Similarly, support member 30 is formed with a set of openings 30*c* and 30*d* which are disposed parallel to slot section 47 and communicate with opening section 48, a set of ball bearings 56 and 58 are disposed in openings 30*c* and 30*d* which are urged into engagement with the inner sides of flange 22 by means of a set of springs 56*a* and 58*a* which engage a set of seating screws 56*b* and 58*b* threaded into openings 30*c* and 30*d*. Seating screws 56*b* and 58*b* are adjustable so as to vary the distance between surfaces 42 and 44 and guide rail flange 22.

The loads on springs 53*a*, 54*a*, 56*a* and 58*a* are adjusted by seating screws 53*b*, 54*b*, 56*b* and 58*b* so that under normal rates of ascent and descent of the user, opening surfaces 44 and 46 of the support member and inner surface 32*a* of the clamping member will be maintained in spaced relation to flange 22 of the rail to prevent such member from engaging the rail.

Figure 5:
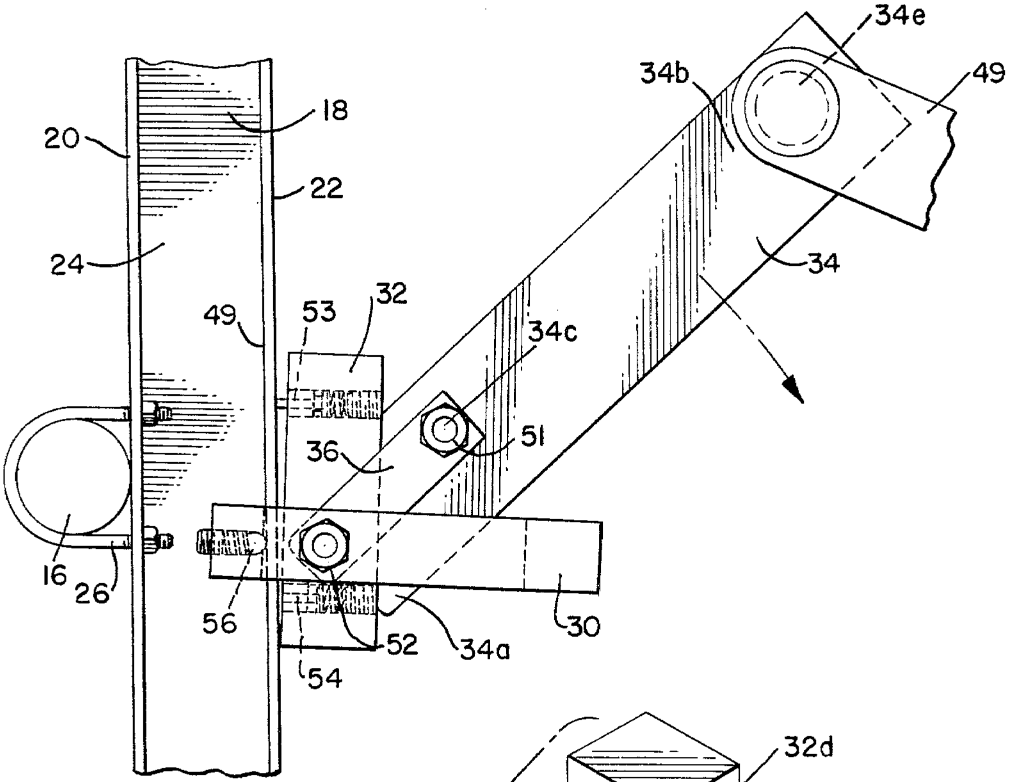
FIG. 5 is a view similar to the view shown in FIG. 2 illustrating the embodiment in the clamping position.

Thus, when the user is ascending or descending ladder 10 at a normal rate, support member 30 and clamping member 32 slide freely along guide rail 18 and more specifically along flange 22 as the spring-biased bearings 56 and 58 and spring-biased pins 53 and 54 maintain locking device 28 out of engagement with guide rail 18. However, as best shown in FIG. 5, when there is an abrupt downward movement of the user as when the user falls, the outer end of the lever will be caused to move downwardly, simultaneously causing the inner end of the lever to pivot about the axis of pin 34*c* and urge the clamping member into engagement with the outer surface of flange 22, and the support member to be moved outwardly into engagement with the inner surfaces of flange 22. Under such circumstances, flange 22 will be gripped firmly between the clamping and support members to arrest the fall of the user. So long as the climber remains suspended, the locking device will remain in gripping relation with the rail. As soon as the climber regains his footing in the ladder and moves his body upwardly, the outer end of the lever will pivot upwardly to release the locking device. The spring load bearings and pins will then again function to maintain the clamping and support members in spaced relation with the flange of the rail.

The present invention is effective in preventing the fall of the user, yet unlikely to interfere with his climbing or descending at a normal rate. Additionally, with the guide rail secured to the rungs of the ladder intermediate the side rails, the user is free to step on and grip the ends of the rungs of the ladder in conventional fashion.

The components of the locking device can be constructed of any suitable materials having sufficient strength characteristics, including both steel and aluminum. In addition, the components can be fabricated by any suitable method which is economical.

From the foregoing, detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A device for arresting the fall of a climber ascending or descending along a vertically disposed rail comprising a support member having an opening therein for receiving said rail therethrough, a clamping member supported on said support member and engageable with a vertical surface of said rail in clamping relation therewith, at least one connecting link pivotally connected to said support member, and an actuating lever pivotally connected to said connecting link, said actuating lever having one end thereof engageable with said clamping member and an opposite end thereof connectable to said climber where upon a sudden downward movement of said climber, as when the climber may be caused to fall, the climber connecting end of said actuating lever shall be caused to pivot downwardly, forcing said clamping member and said support member into gripping engagement with said rail, thereby arresting the downward movement of said climber.

2. A device according to claim 1 including means for yieldably biasing said clamping member out of engagement with said rail.

3. A device according to claim 1 wherein said clamping member is disposed in said support member opening.

4. A device according to claim 3 including means for yieldably biasing said clamping member out of engagement with said rail.

5. A device according to claim 1 wherein said vertically disposed rail has a T-shaped cross-sectional configuration including a web section and a flange section disposed perpendicular to said web section and an outer, vertically-disposed clamping member engaging surface, and wherein said support member opening includes a portion receiving said rail web section therethrough and wall surfaces engageable with inner surfaces of said rail flange section.

6. A device according to claim 5 including means for yieldably biasing said clamping member out of engagement with said rail.

7. A device according to claim 5 wherein said clamping member is disposed in said support member opening.

8. A device according to claim 7 including means for yieldably biasing said clamping member out of engagement with said rail.

9. A device according to claim 5 including means for yieldably biasing said support member wall surfaces engageable with said inner surfaces of said flange section out of engagement with said rail.

10. A device according to claim 5 including a pair of connecting links pivotally connected at one set of ends thereof to said support member, and wherein said actuating lever is pivotally connected to an opposite set of ends of said connecting links.

11. A device according to claim 10 including means for yieldably biasing said clamping member out of engagement with said rail.

12. A device according to claim 10 wherein said clamping member is disposed in said support member opening.

13. A device according to claim 12 including means for yieldably biasing said clamping member out of engagement with said rail.

14. A device according to claim 10 including means for yieldably biasing said support member wall surfaces engageable with said inner surfaces of said rail flange section out of engagement with said rail flange section.

15. A device according to claim 2 wherein said means for yieldably biasing said clamping member out of engagement with said rail comprise a pair of spring biased pins.

16. A device according to claim 6 wherein said means for yieldably biasing said clamping member out of engagement with said rail comprises a pair of spring biased pins.

17. A device according to claim 11 wherein said means for yieldably biasing said clamping member out of engagement with said rail comprises a pair of spring biased pins.

18. A device according to claim 9 wherein said means for yieldably biasing said support member wall surfaces out of engagement with said inner surfaces of said rail flange section comprise spring biased ball bearings.

19. A device according to claim 14 wherein said means for yieldably biasing said support member wall surfaces out of engagement with said inner surfaces of said rail flange section comprise spring biased ball bearings.

20. A device for arresting the fall of a climber ascending or descending along a vertically disposed member comprising a vertically disposed rail rigidly mountable on said vertically disposed member, a support member having an opening therein receiving said rail therethrough, a clamping member supported on said support member and engageable with a vertical surface of said rail in clamping relation therewith, at least one connecting link pivotally connected to said supporting member, and an actuating member lever pivotally connected to said connecting link, said actuating lever having one end thereof engageable with said clamping member and an opposite end thereof connectable to said climber where upon a sudden downward movement of said climber, as when the climber may be caused to fall, the connecting end of said actuating lever shall be caused to pivot downwardly, forcing said clamping member and said support member into gripping engagement with said rail, thereby arresting the downward movement of said climber.

* * * * *